US012311665B2

(12) United States Patent
Sugiura

(10) Patent No.: US 12,311,665 B2
(45) Date of Patent: May 27, 2025

(54) LIQUID DISCHARGE HEAD

(71) Applicant: BROTHER KOGYO KABUSHIKI KAISHA, Nagoya (JP)

(72) Inventor: Keita Sugiura, Toyokawa (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 201 days.

(21) Appl. No.: 18/320,249

(22) Filed: May 19, 2023

(65) Prior Publication Data

US 2023/0382112 A1 Nov. 30, 2023

(30) Foreign Application Priority Data

May 25, 2022 (JP) ................................ 2022-085447

(51) Int. Cl.
*B41J 2/14* (2006.01)

(52) U.S. Cl.
CPC ......... *B41J 2/14233* (2013.01); *B41J 2/1408* (2013.01); *B41J 2002/14258* (2013.01); *B41J 2002/14491* (2013.01)

(58) Field of Classification Search
CPC .................. B41J 2/14233; B41J 2/1408; B41J 2002/14258; B41J 2002/14491; B41J 2002/14217; B41J 2002/14225; B41J 2/14209; B41J 2002/14459; B41J 2202/08
See application file for complete search history.

(56) References Cited

U.S. PATENT DOCUMENTS

2019/0100005 A1 4/2019 Mori
2020/0324547 A1* 10/2020 Aiba .................. B41J 2/14233
2021/0305486 A1 9/2021 Kura

FOREIGN PATENT DOCUMENTS

JP 2010-82900 A 4/2010
JP 201964148 A 4/2019
JP 2021158294 A 10/2021

* cited by examiner

*Primary Examiner* — Lisa Solomon
(74) *Attorney, Agent, or Firm* — Merchant & Gould P.C.

(57) ABSTRACT

There is provided a liquid discharge head including: a channel member having individual channels, each of the individual channels including a nozzle and a pressure chamber communicating with the nozzle; and an actuator member arranged on a surface of the channel member and having actuators each of which overlaps with the pressure chamber of one of the individual channels in a first direction orthogonal to the surface, the actuator member including individual electrodes constructing the actuators, branched parts each connecting individual electrodes of the individual electrodes, and a trunk part connecting the branched parts and provided with a contact with respect to an electric power supply part. A cooling channel which is independent from the individual channels and in which a cooling liquid flows is formed in the liquid discharge head. The cooling channel has a first part overlapping with the trunk part in the first direction.

7 Claims, 13 Drawing Sheets

LIQUID DISCHARGE HEAD

REFERENCE TO RELATED APPLICATIONS

This application claims priority from Japanese Patent Application No. 2022-085447 filed on May 25, 2022. The entire content of the priority application is incorporated herein by reference.

BACKGROUND ART

There is a publicly known head (liquid discharge head) provided with a channel member having a plurality of pressure chambers formed therein, and an actuator member arranged on a surface of the channel member. The actuator member includes: a plurality of individual parts (individual electrodes) each of which corresponds to one of the plurality of pressure chambers; a plurality of branched parts each of which connects individual parts of the plurality of individual parts; and a trunk part which connects the plurality of branched parts. A contact with respect to a COF (electric power supply part) is provided on the trunk part.

DESCRIPTION

The trunk part is a part which supplies an electric charge from the electric power supply part to the plurality of individual electrodes via the plurality of branched parts, and in which a large amount of the electric charge, as compared with in the plurality of branched parts and the plurality of individual electrodes, flows, and of which heat value tends to be great. Due to this, the temperature in a vicinity part, in the channel member, which is in the vicinity of the trunk part locally might become to be high, leading to any unevenness in the viscosity of the liquid inside the channel member. With this, the quality of an image formed by the liquid might be deteriorated.

An object of the present disclosure is to provide a liquid discharge head capable of suppressing occurrence of any unevenness in the viscosity of the liquid inside the channel member in a configuration wherein the actuator member includes the trunk part.

According to an aspect of the present disclosure, there is provided a liquid discharge head including: a channel member; an actuator member; and a cooling channel. The channel member includes a plurality of individual channels. Each of the plurality of individual channels includes a nozzle and a pressure chamber communicating with the nozzle. The actuator member is located on a surface of the channel member and includes a plurality of actuators overlapping with the pressure chamber of one of the plurality of individual channels in a first direction orthogonal to the surface. The actuator member includes: a plurality of individual electrodes of the plurality of actuators; a plurality of branched parts each of which connects individual electrodes of the plurality of individual electrodes; and a trunk part connecting the plurality of branched parts and including a contact with respect to an electric power supply part. The cooling channel is independent from the plurality of individual channels. The cooling channel in which a cooling liquid flows is formed in the liquid discharge head. The cooling channel includes a first part overlapping with the trunk part in the first direction.

According to the present disclosure, a vicinity part, in the channel member, which is in the vicinity of the trunk part is cooled by the cooling liquid flowing in the first part of the cooling channel, thereby suppressing the occurrence of such a situation that the temperature of the vicinity part locally becomes to be high. With this, it is possible to suppress any unevenness in the viscosity of the liquid inside the channel member.

In the following explanation, a Z direction is a vertical direction, and an X direction and a Y direction are each a horizontal direction. The X direction and the Y direction are orthogonal to the Z direction. The X direction is orthogonal to the Y direction. The Z direction corresponds to a "first direction" of the present disclosure, the X direction corresponds to a "second direction" of the present disclosure and the Y direction corresponds to a "third direction" of the present disclosure.

<Overall Configuration of Printer>

Figure 1:
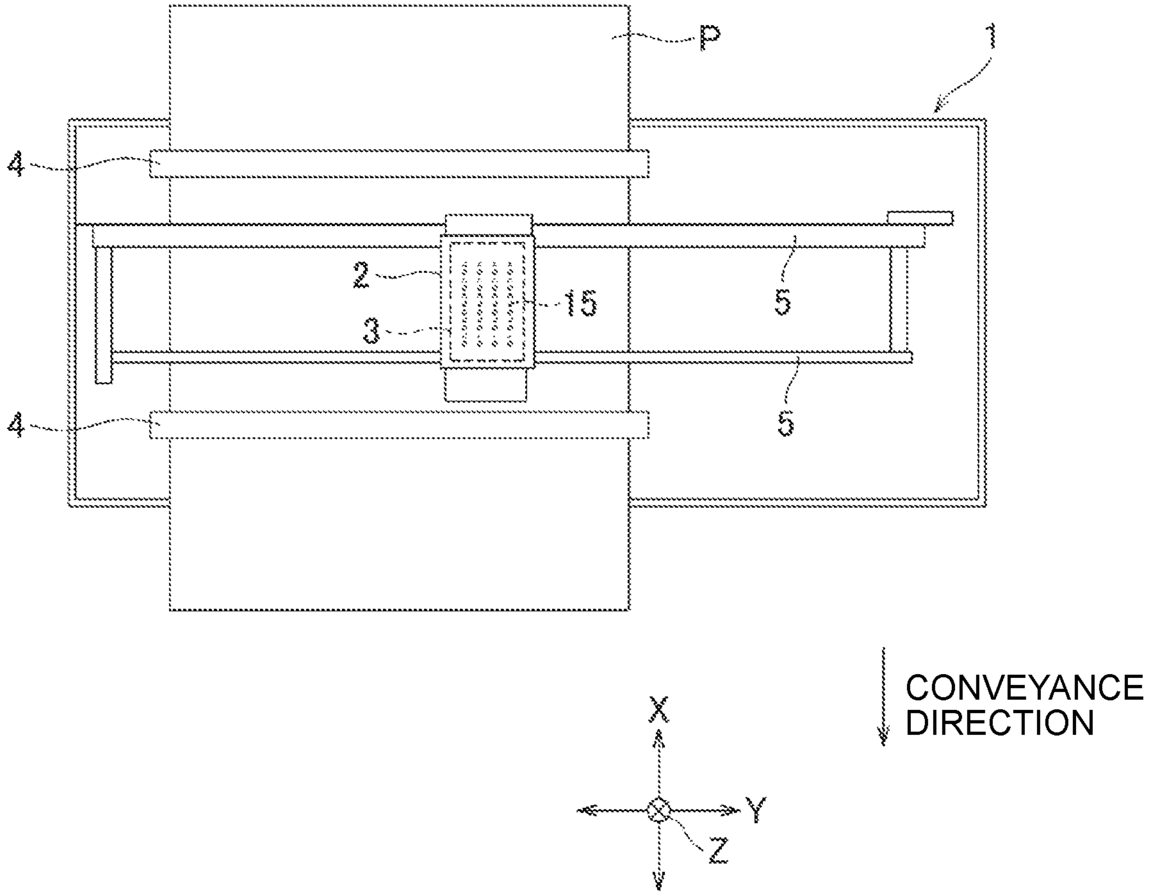
FIG. 1 is a view depicting the overall configuration of a printer including a head.

First, the overall configuration of a printer 1 including a head 3 according to an embodiment of the present disclosure will be explained, with reference to FIG. 1.

The printer 1 is provided with the head 3, a carriage 2 and two conveying roller pairs 4.

The carriage 2 is supported by two guide rails 5 extending in the Y direction and is movable along the two guide rails 5 in the Y direction.

The head 3 is of a serial system, is mounted on the carriage 2 and is movable in the Y direction together with the carriage 2. A plurality of nozzles 15 is opened in a lower surface of the head 3.

The two conveying roller pairs 4 are arranged while sandwiching the carriage 2 therebetween in the X direction. In a case that the two conveying roller pairs 4 rotate in a state that the two conveying roller pairs 4 pinch or held a paper sheet P (paper P, sheet P), thereby conveying the paper sheet P in a conveyance direction along the X direction.

A controller (not depicted in the drawings) of the printer 1 alternately performs a discharge operation of discharging an ink from the plurality of nozzles 15 while moving the head 3, together with the carriage 2, in the Y direction, and a conveyance operation of conveying the paper sheet P in the conveyance direction by a predefined amount by the two roller pairs 4. With this, an image is recorded on the paper sheet P.

<Head>

Figure 2:
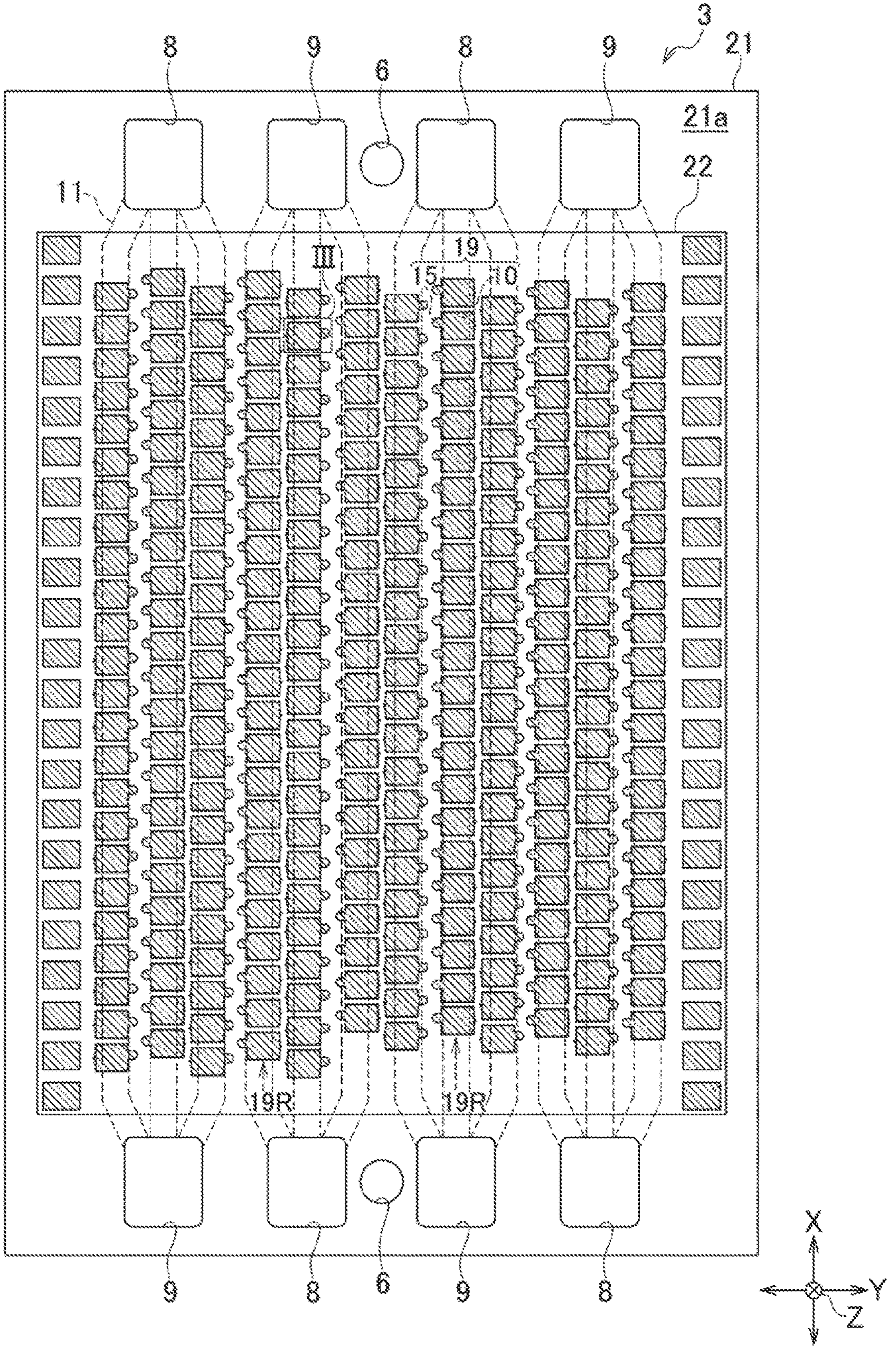
FIG. 2 is a plane view of the head depicted in FIG. 1.

As depicted in FIG. 2, the head 3 has a channel member 21 and an actuator member 22. Each of the channel member 21 and the actuator member 22 is rectangular shaped of which length in the X direction is longer than a length thereof in the Y direction in a plane orthogonal to the Z direction.

<Channel Member>

Figure 4:
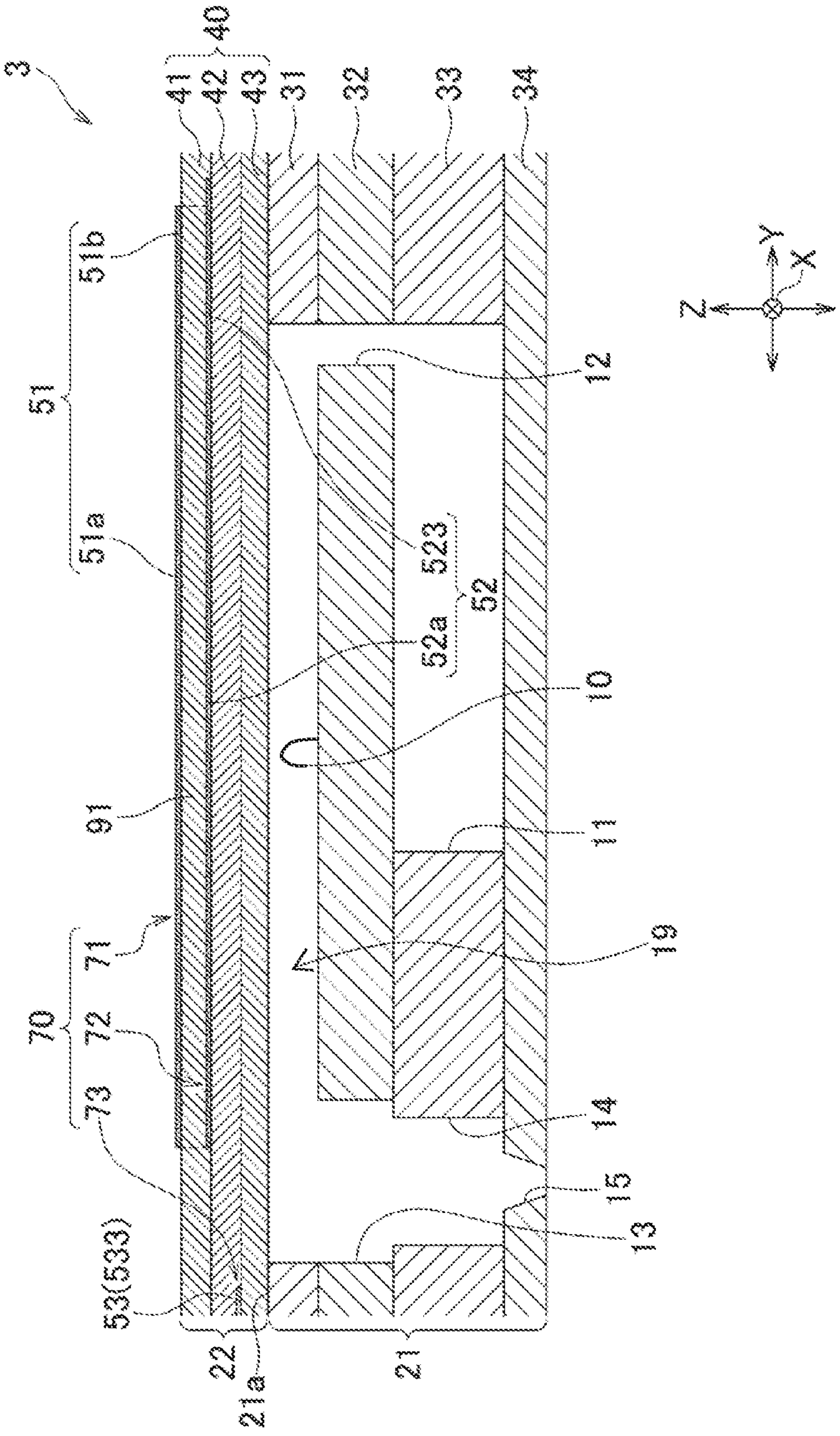
FIG. 4 is a cross-sectional view along an IV-IV line of FIG. 3.

As depicted in FIG. 4, the channel member 21 is constructed of four metallic plates 31 to 34 which are stacked in the Z direction.

A plurality of pressure chambers 10 is formed in the plate 31. In the plate 32, communicating channels 12 and communicating channels 13 are formed each for one of the plurality of pressure chambers 10. Each of the communicating channels 12 and each of the communicating channels 13 overlap, in the Z direction, respectively, with one end and the other end in the Y direction of one of the plurality of pressure chambers 10 corresponding thereto. In the plate 33, a communicating channel 14 is formed with respect to each of the communicating channels 13. The communicating channel 14 overlaps, in the Z direction, with one of the communicating channels 13 corresponding thereto. The plurality of nozzles 15 is formed in the plate 34. Each of the plurality of nozzles 15 overlaps, in the Z direction, with the communicating channel 14.

The channel member 21 is formed with a plurality of individual channels 19 each of which includes a nozzle 15 of the plurality of nozzles 15 and a pressure chamber 10 of the plurality of pressure chambers 10 communicating with the nozzle 15. As depicted in FIG. 2, the plurality of individual channels 19 is aligned in the X direction so as to construct 12 pieces of an individual channel row 19R. The twelve individual channel rows 19R are arranged side by side in the Y direction.

Figure 10:
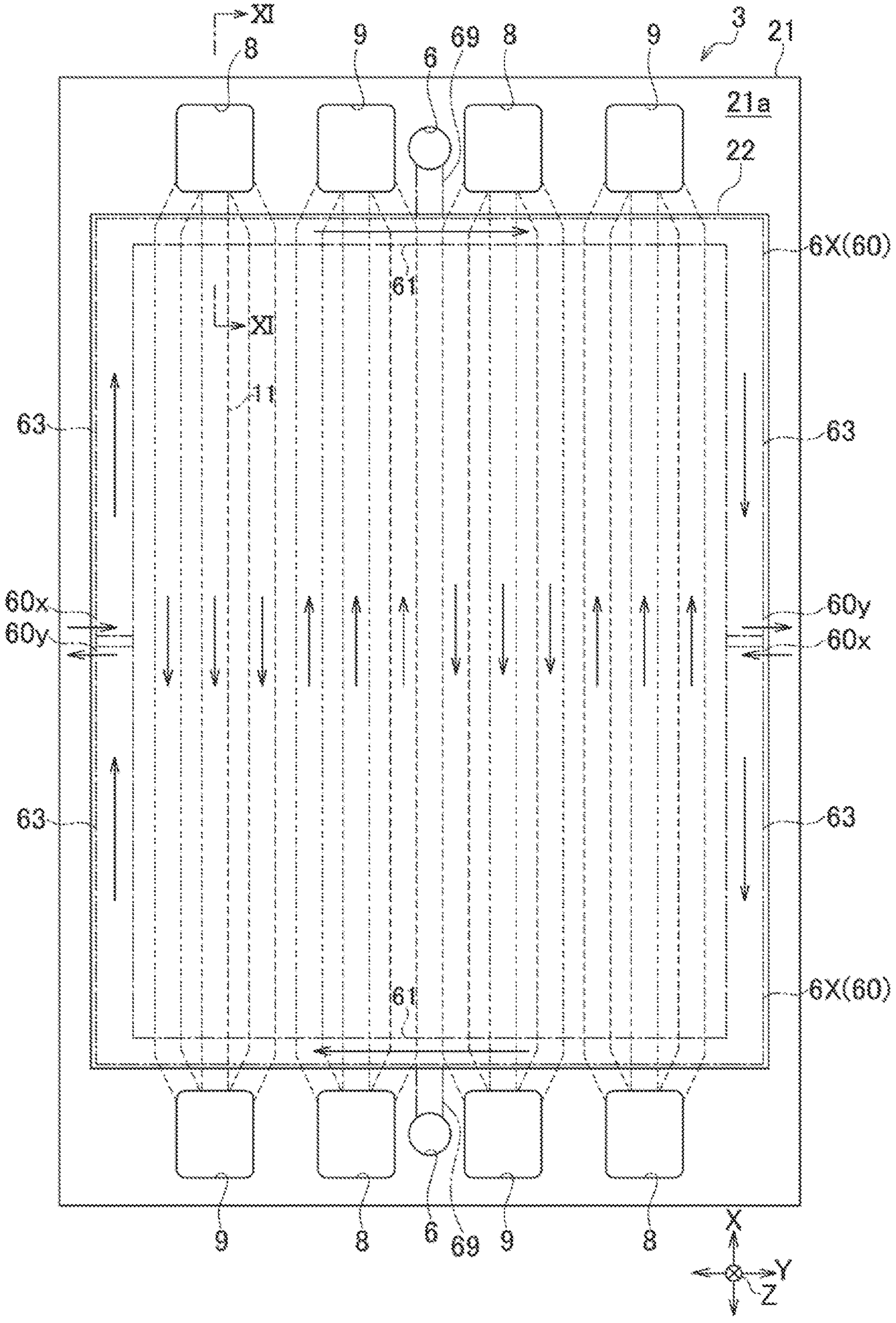
FIG. 10 is a plane view depicting a channel inside the head and corresponding to FIG. 2.

Twelve pieces of a common channel 11 are further formed in the channel member 21 (see FIG. 2 and FIG. 10). The twelve common channels 11 are formed in the plate 33 (see FIG. 4), and each of the twelve common channels 11 is provided on one of the twelve individual channel rows 19R (see FIG. 2). Each of the twelve common channels 11 extends in the X direction, and communicates with individual channels 19, of the plurality of individual channels 19, which construct an individual channel row 19R, of the twelve individual channel rows 19R, corresponding thereto. The twelve common channels 11 are arranged side by side in the Y direction.

In an upper surface of the plate 31 (a surface 21*a* of the channel member 21), an ink supply port 8, an ink return port 9 and a cooling liquid communication port 6 are formed in an area in which the actuator member 22 is not arranged (see FIG. 2). Two pieces of the ink supply port 8, two pieces of the ink return port 9 and one piece of the cooling liquid communicating port 6 are arranged on each of one side and the other side in the X direction with respect to the actuator member 22. The cooling liquid communication port 6 is arranged in the center in the Y direction of the channel member 21. The ink supply ports 8 and the ink return ports 9 are arranged alternately in the Y direction.

The ink supply ports 8 and the ink return ports 9 communicate with an ink tank (not depicted in the drawings). Each of the ink supply ports 8 and each of the ink return ports 9 are arranged, respectively, at positions sandwiching three pieces of the common channel 11, of the twelve common channels 11, therebetween in the X direction, and communicate with the three common channels 11 (see FIG. 10). Each of the common channels 11 has one end communicating with the ink supply port 8 and the other end communicating with the ink return port 9. The ink supplied from the ink tank to each of the ink supply ports 8 is supplied to the three common channels 11 and is returned to the ink tank from each of the ink return ports 9.

The ink is supplied from each of the common channels 11 to individual channels 19, of the plurality of individual channels 19, constructing an individual channel row 19R, of the twelve individual channel rows 19R, corresponding to each of the common channels 11. Further, in a case that the actuator member 22 is driven as will be described later on, a pressure is applied to the ink in each of the plurality of pressure chambers 10, and the ink flows through one of the communicating channels 13 and the communicating channel 14 and is discharged or ejected from one of the plurality of nozzles 15.

A flow of a cooling liquid via the cooling liquid communication port 6 will be described in detail later on.

<Actuator Member>

As depicted in FIG. 4, the actuator member 22 is arranged on the surface 21*a* of the channel member 21. The actuator member 22 has a piezoelectric body 40 including three piezoelectric layers 41 to 43 and an electrode body 70 including three electrode layers 71 to 73 arranged, respectively, on upper surfaces of the electrode layers 41 to 43.

The three piezoelectric layers 41 to 43 are each formed of a piezoelectric material composed primarily of lead zirconate titanate, etc., and are stacked in the Z direction. The piezoelectric layer 42 is arranged between the piezoelectric layers 41 and 43.

The piezoelectric layer 43 is arranged on the upper surface of the plate 31 (the surface 21*a* of the channel member 21) and covers all the plurality of pressure chambers 10 formed in the plate 31.

Figure 7:
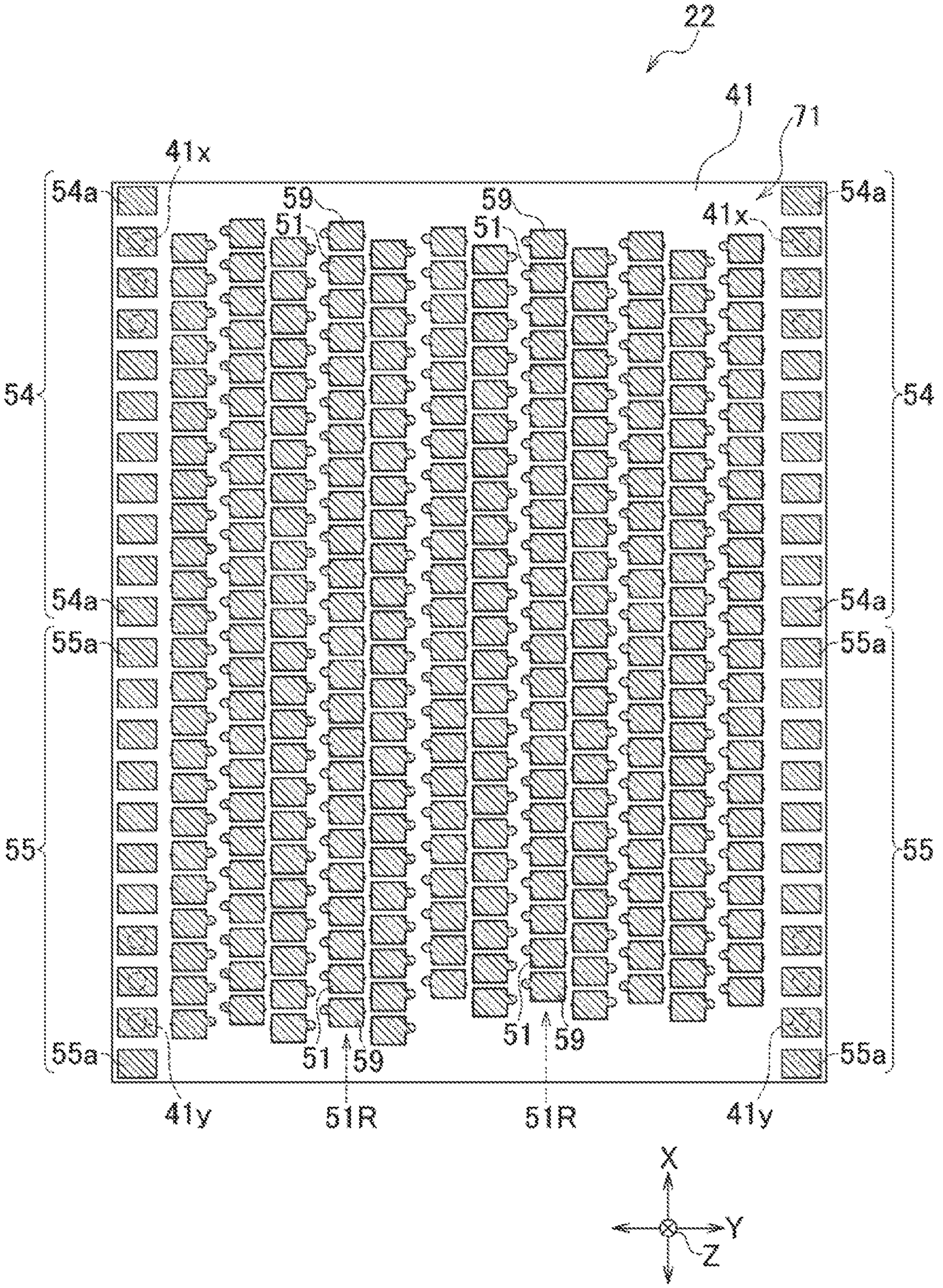
FIG. 7 is a plane view depicting an upper surface of an uppermost piezoelectric layer among three piezoelectric layers constructing an actuator member of FIG. 2.

Among the three electrode layers 71 to 73, the electrode layer 71 arranged on the upper surface of the piezoelectric layer 41 (a surface, of the piezoelectric layer 41, which is on a side opposite to the piezoelectric layer 42 in the Z direction) includes a plurality of driving electrodes 51, a dummy electrode 59, two high potential parts 54 and two low potential parts 55, as depicted in FIG. 7. The electrode layer 71 corresponds to a "first electrode layer" of the present disclosure.

Figure 3:
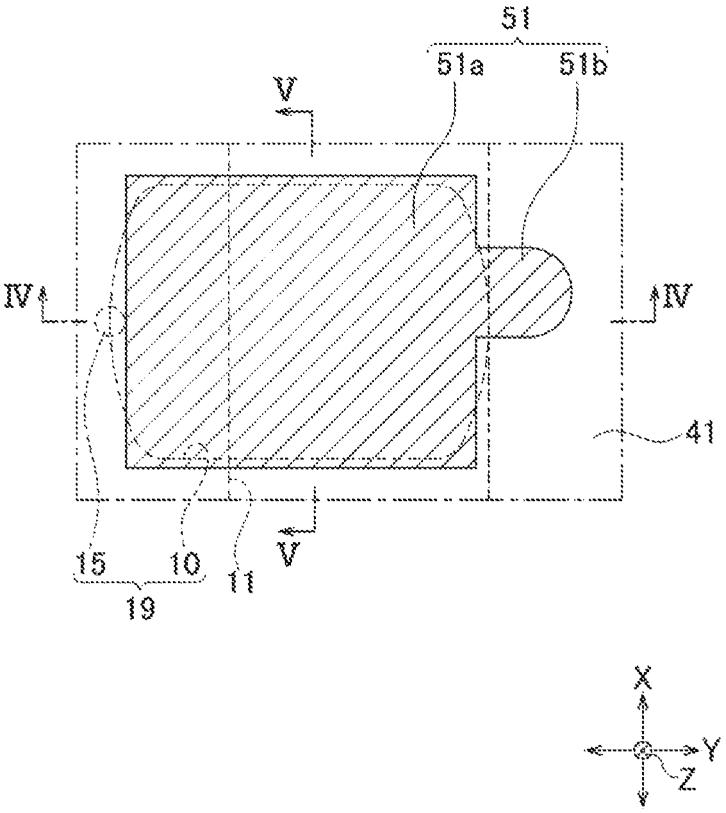
FIG. 3 is an enlarged view of an area III of FIG. 2.

As depicted in FIG. 3, each of the plurality of driving electrodes 51 is arranged to correspond to one of the plurality of pressure chambers 10. Each of the plurality of driving electrodes 51 has a main part 51*a* and a projected part 51*b*. The main part 51*a* overlaps, in the Z direction, substantially with the entire area of a pressure chamber 10, of the plurality of pressure chambers 10, corresponding thereto. The projected part 51*b* projects from the main part 51*b* in the Y direction and does not overlap with the pressure chamber 10 corresponding thereto. The projected part 51*b* is provided with a contact which is electrically connected to a COF (Chip On Film) 81 (see FIGS. 12 and 13). A driver IC 82 (see FIGS. 12 and 13) mounted on the COF 81 is controlled by the controller so as to supply a driving signal individually to each of the plurality of driving electrodes 51 via a wiring of the COF 81, and to selectively apply either of a high potential (VDD potential) and a low potential (GND potential) individually to each of the plurality of driving electrodes 51. The high potential corresponds to a "first potential" of the present disclosure, and the low potential corresponds to a "second potential" of the present disclosure, and the plurality of driving electrodes 51 each corresponds to a "first electrode" of the present disclosure. The COF 81 corresponds to an "electric power supply part"

of the present disclosure, and the driver IC 82 corresponds to a "driving circuit" of the present disclosure.

As depicted in FIG. 7, the plurality of driving electrodes 51 are aligned in the X direction and construct a plurality of driving electrode rows 51R each of which corresponds to one of the twelve individual channel rows 19R (see FIG. 2). The plurality of driving electrode rows 51R are arranged side by side in the Y direction.

The dummy electrode 59 is provided as dummy electrodes 59 which are provided, on each of the plurality of driving electrode rows 51R, respectively on one side in the X direction (upper side in FIG. 7) and the other side in the X direction (lower side in FIG. 7). The dummy electrodes 59 have a size and a shape in the plane orthogonal to the Z direction which are same as those of the driving electrodes 51 belonging to a driving electrode row 51R, of the plurality of driving electrode rows 19R, corresponding thereto, and the dummy electrodes 59 are arranged, together with the driving electrodes 51, at equal intervals in the X direction. The dummy electrodes 59 are not electrically connected to the COF 81, and the potential is not applied to the dummy electrodes 59. By providing the dummy electrodes 59, it is possible to suppress a difference in a contracting amount due to electrode formation between a driving electrode 51, of the plurality of driving electrodes 51, which is located at a center in the X direction and another driving electrode 51, of the plurality of driving electrodes 51, which is located at an end part in the X direction in each of the plurality of driving electrode rows 51R, thereby making it possible to suppress any variation in an discharge amount among nozzles 15, of the plurality of nozzles which correspond to each of the plurality of driving electrode rows 51R.

The two high potential parts 54 are arranged, respectively, on one end in the Y direction (the left end of FIG. 7) and the other end in the Y direction (the right end of FIG. 7) of the piezoelectric layer 41, at a location on one side in the X direction (the upper side of FIG. 7) in the piezoelectric layer 41. The two low potential parts 55 are arranged, respectively, on the one end in the Y direction (the left end of FIG. 7) and the other end in the Y direction (the right end of FIG. 7) of the piezoelectric layer 41, at a location on the other side in the X direction (the lower side of FIG. 7) in the piezoelectric layer 41.

Each of the two high potential parts 54 is constructed of a plurality of electrodes 54*a* arranged to be separated from each other in the X direction. Each of the two low potential parts is constructed of a plurality of electrodes 55*a* arranged to be separated from each other in the X direction. The plurality of electrodes 54*a* and the plurality of electrodes 55*a* have sizes and shapes in the plane orthogonal to the Z direction which are substantially and mutually same. The driver IC 82 is controlled by the controller so as to supply the high potential (VDD potential) to the plurality of electrodes 54*a* and to apply the low potential (GND potential) to the plurality of electrodes 55*a* via the wiring of the COF 81. The plurality of electrodes 54*a* is maintained at the high potential, and the plurality of electrodes 55*a* is maintained at the low potential.

Figure 8:
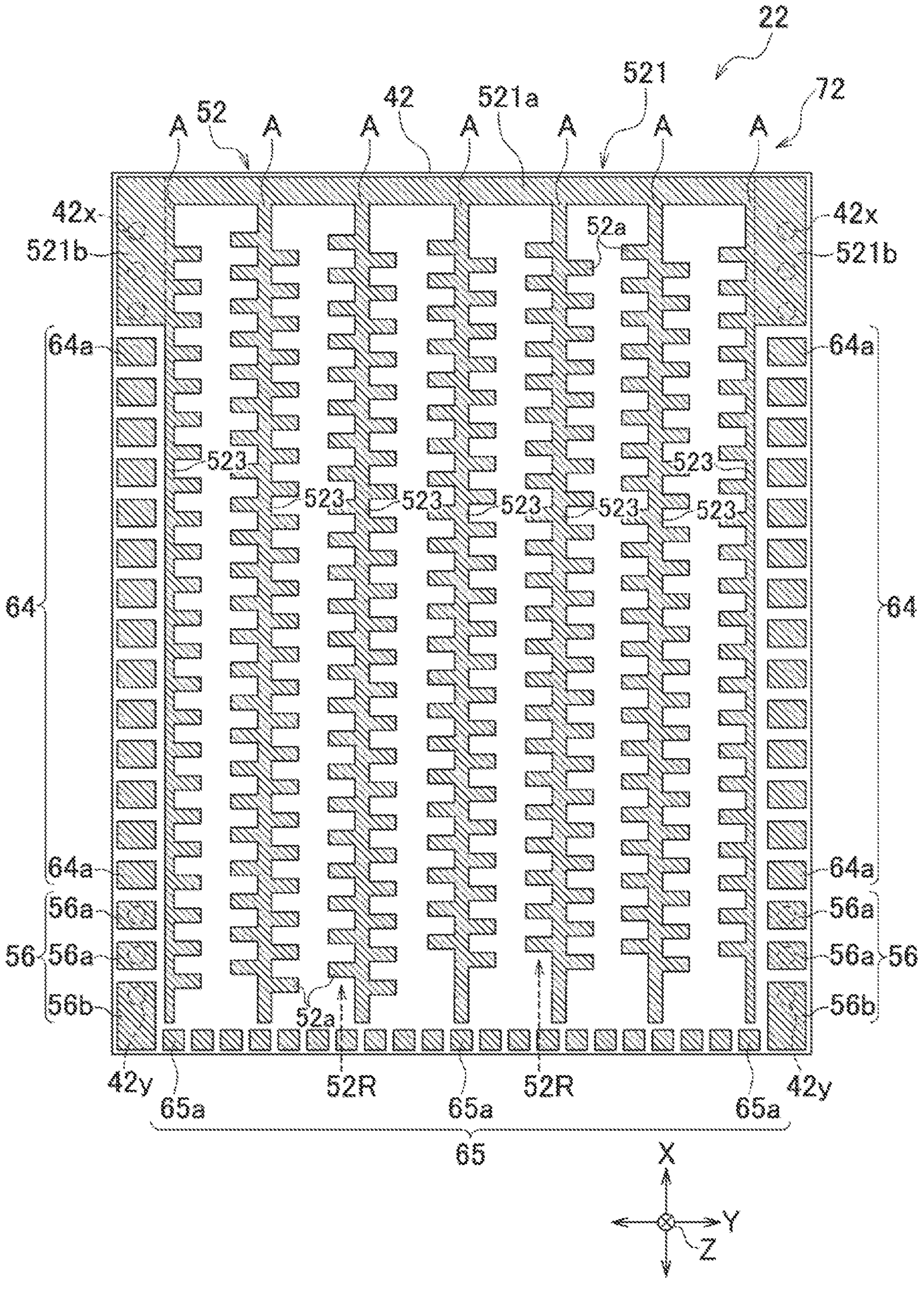
FIG. 8 is a plane view depicting an upper surface of an intermediate piezoelectric layer among the three piezoelectric layers constructing the actuator member of FIG. 2.

Among the three electrode layers 71 to 73, the electrode 72 arranged on an upper surface of the piezoelectric layer 42 (between the piezoelectric layer 41 and the piezoelectric layer 42 in the Z direction) has a high potential electrode 52, two low potential parts 56, two floating electrode parts 64 and a floating electrode part 65, as depicted in FIG. 8. The electrode layer 72 corresponds to a "second electrode layer" of the present disclosure.

The high potential electrode 52 has a trunk part 521, seven branched parts 523 branched (bifurcated) from the trunk part 521 and a plurality of individual electrodes 52*a* each of which is branched (bifurcated) from one of the seven branched parts 523. The high potential electrodes 52 is maintained at the high potential (first potential) and corresponds to a "second electrode" of the present disclosure.

The trunk part 521 includes one extending part 521*a* which extends in the Y direction and two extending parts 521*b* each of which extends in the X direction. The extending part 521*a* extends in the Y direction at an end in the X direction (upper end of FIG. 8) of the piezoelectric layer 42. One of the two extending parts 521*b* is connected to one end in the Y direction (left end of FIG. 8) of the extending part 521*a*; the other of the two extending parts 5521*b* is connected to the other end in the Y direction (right end of FIG. 8) of the extending part 521*a*. Each of the two extending parts 521*b* extends from a contact part thereof with respect to the extending part 521*a* toward the other side in the X direction (lower side of FIG. 8).

Each of the two extending parts 521*b* overlaps, in the Z direction, with three electrodes 54*a* (see FIG. 7), of the plurality of electrodes 54*a*, constructing one of the two high potential parts 54. Each of the two extending parts 521*b* is electrically connected to the three electrodes 54*a* via through holes 41*x* (see FIG. 7) formed in the piezoelectric layer 41 and receives the high potential from the three electrodes 54*a*. Namely, each of the two extending parts 521*b* is provided with a contact with respect to the COF 81 which is the electric power supply part. The high potential received by the two extending parts 521*b* is supplied to each of the plurality of individual electrodes 52*a* via one of the seven branched parts 523.

The seven branched parts 523 each extend from the extending part 521*a* toward the other side in the X direction (lower side of FIG. 8) and are arranged side by side in the Y direction. A width of each of the seven branched parts 523 is smaller than a width of the trunk part 521 (the extending parts 521*a* and 521*b*).

Each of the plurality of individual electrodes 52*a* has a part which overlaps, in the Z direction, with a central part in the X direction of one of the plurality of pressure chambers 10, and which overlaps with one of the plurality of driving electrodes 51 in the Z direction (see FIG. The plurality of individual electrodes 52 are aligned in the X direction and construct a plurality of individual electrode rows 52R each of which corresponds to one of the plurality of driving electrode rows 51R (see FIG. 7). The plurality of individual electrode rows 52R are arranged side by side in the Y direction.

Each of the seven branched parts 523 connects individual electrodes 52*a*, of the plurality of individual electrodes 52*a*, constructing one of the individual electrode rows 52R. The extending part 521*a* of the trunk part 521 connects the seven branched parts 523. The extending part 521*a* has seven bifurcation parts A from each of which one of the seven branched parts 523 is bifurcated (branched).

The two low potential parts 56 are arranged, respectively, on one end in the Y direction (left end of FIG. 8) and on the other end in the Y direction (right end of FIG. 8) of the piezoelectric layer 42, on the other side in the X direction (lower side of FIG. 8) in the piezoelectric layer 42. Each of the two low potential parts 56 is constructed of two electrodes 56*a* and one electrode 56*b* which are arranged to be separated from one another in the X direction.

The two floating electrode parts 64 are arranged, respectively, on the one end in the Y direction (left end of FIG. 8)

and on the other end in the Y direction (right end of FIG. 8) of the piezoelectric layer 42, at a location between the two extending parts 521*b* and the two low potential parts 56 in the X direction. Each of the two floating electrode parts 64 is constructed of a plurality of electrodes 64*a* which are arranged to be separated from each other in the X direction.

The floating electrode part 65 is arranged at the other end in the X direction (lower end of FIG. 8) of the piezoelectric layer 42. The floating electrode part 65 is constructed of a plurality of electrodes 65*a* which are arranged to be separated from each other in the Y direction. The plurality of electrodes 65*a* have a size and a shape in the plane orthogonal to the Z direction which are substantially and mutually same among the plurality of electrodes 65*a*, and the plurality of electrodes 65*a* are arranged side by side in the Y direction at equal intervals therebetween.

The two electrodes 56*a* of each of the two low potential parts 56 and the plurality of electrodes 64*a* of each of the two floating electrodes part 64 have a size and a shape in the plane orthogonal to the Z direction which are substantially and mutually same with each other, and are arranged at each of the one end in the Y direction (left end of FIG. 8) and the other end in the Y direction (right end of FIG. 8) of the piezoelectric layer 42, at equal intervals therebetween. On the other hand, the electrode 56*b* of each of the two low potential parts 56 has a length in the X direction which is longer than that of the two electrodes 56*a*.

The two electrodes 56*a* overlap, in the Z direction, respectively with two electrodes included in the plurality of electrodes 55*a* of the low potential part 55 (see FIG. 7). The two electrodes 56*a* are electrically connected to the above-described two electrodes 55*a* via, respectively, through holes 41*y* formed in the piezoelectric layer 41 (see FIG. 7) and receive the low potential from the two electrodes 55*a*.

The electrode 56*b* overlaps, in the Z direction, with one electrode 55*a* included in the plurality of electrodes 55*a* of the low potential part 55 (see FIG. 7). The electrode 56*b* is electrically connected to the above-described one electrode 55*a* via a through hole 41*y* formed in the piezoelectric layer 41 (see FIG. 7) and receives the low potential from the one electrode 55*a*.

The plurality of electrodes 64*a* of each of the two floating electrode parts 64 and the plurality of electrodes 65*a* of the floating electrode part 65 are not electrically connected to any electrodes, and the potential is not applied to the plurality of electrodes 64*a* and the plurality of electrodes 65*a*.

Figure 9:
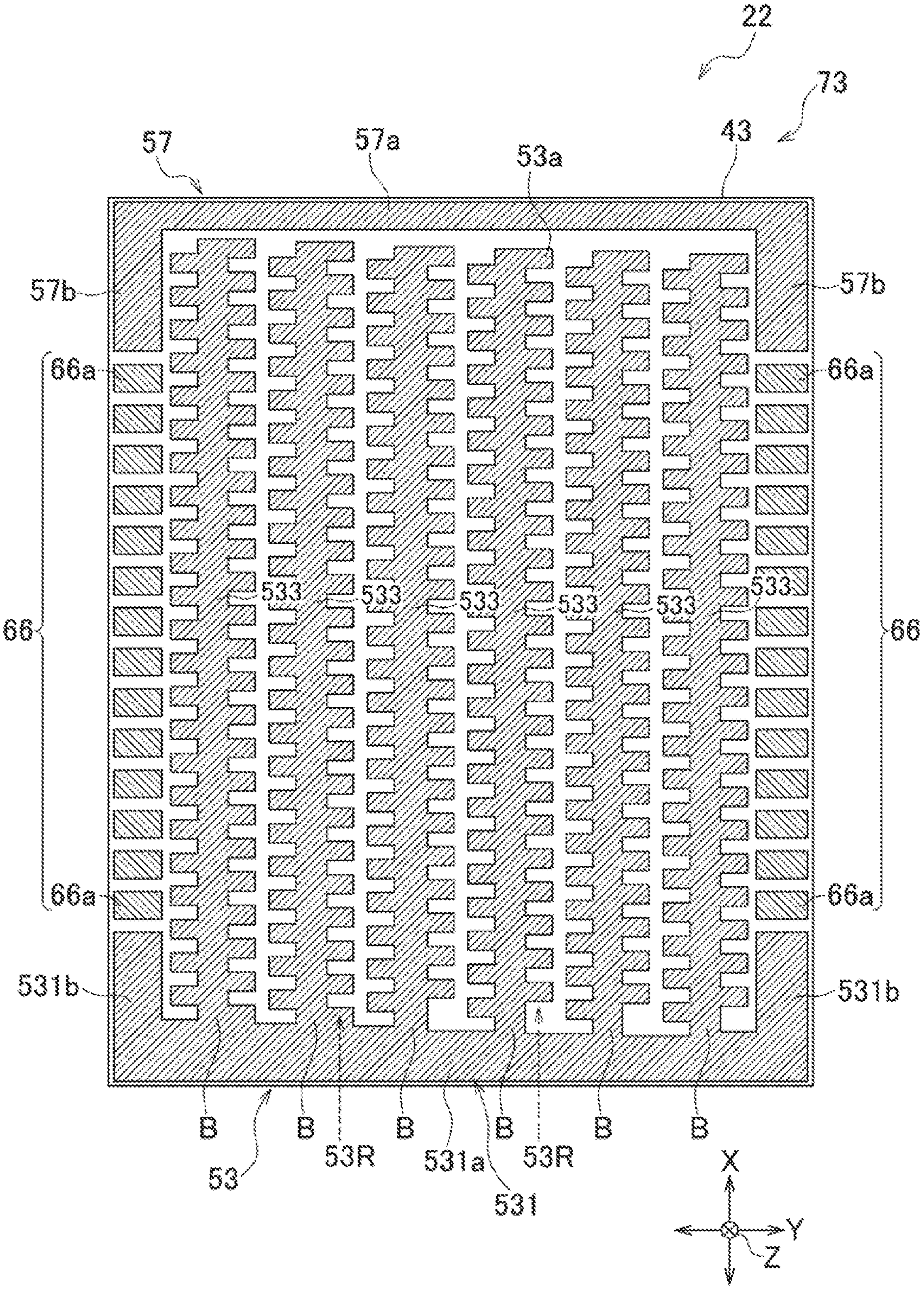
FIG. 9 is a plane view depicting an upper surface of a lowermost piezoelectric layer among the three piezoelectric layers constructing the actuator member of FIG. 2.

Among the three electrode layers 71 to 73, the electrode layer 73 arranged on an upper surface of the piezoelectric layer 43 (a surface, of the piezoelectric layer 42, on a side opposite to the piezoelectric layer 41 in the Z direction) includes a low potential electrode 53, a high potential part 57 and two floating electrode parts 66, as depicted in FIG. 9. The electrode layer 73 corresponds to a "third electrode layer" of the present disclosure.

The low potential electrode 53 has a trunk part 531, six branched parts 533 branched (bifurcated) from the trunk part 531 and a plurality of individual electrodes 53*a* branched from each of the six branched parts 533. The low potential electrode 53 is maintained at the low potential (second potential) and corresponds to a "third electrode" of the present disclosure.

The trunk part 531 includes one extending part 531*a* which extends in the Y direction and two extending parts 531*b* each of which extends in the X direction. The extending part 531*a* extends in the Y direction at the other end in the X direction (lower end of FIG. 9) of the piezoelectric layer 43. One of the two extending parts 531*b* is connected to one end in the Y direction (left end of FIG. 9) of the extending part 531*a*; the other of the two extending parts 531*b* is connected to the other end in the Y direction (right end of FIG. 9) of the extending part 531*a*. Each of the two extending parts 531*b* extends from a contact part thereof with respect to the extending part 531*a* toward one side in the X direction (upper side of FIG. 9).

Each of the two extending parts 531*b* overlaps, in the Z direction, with three electrodes 55*a*, of the plurality of electrodes 55*a*, constructing one of the two low potential parts (see FIG. 7) and the three electrodes 56*a* and 56*b* (see FIG. 8) of one of the two low potential parts 56 (see FIG. 8). Each of the two extending parts 531*b* are electrically connected to the three electrodes 56*a* and 56*b* via, respectively, through holes 42*y* (see FIG. 8) formed in the piezoelectric layer 42 and receives the low potential from the three electrodes 56*a* and 56*b*. Namely, each of the two extending parts 531*b* is provided with a contact with respect to the COF 81 which is the electric power supply part. The low potential received by the two extending parts 531*b* is supplied to each of the individual electrodes 53*a* via one of the six branched parts 533.

The six branched parts 533 each extend from the extending part 531*a* toward one side in the X direction (upper side of FIG. 9) and are arranged side by side in the Y direction. A width of each of the six branched parts 533 is smaller than a width of the trunk part 531 (the extending parts 531*a* and 531*b*).

Figure 5:
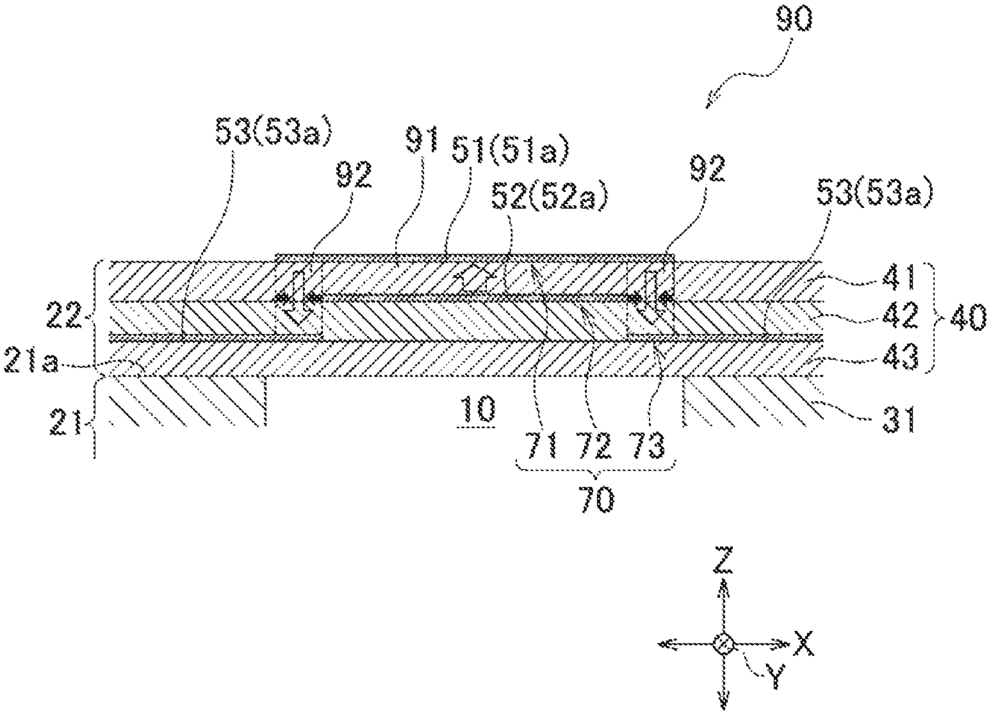
FIG. 5 is a cross-sectional view along a V-V line of FIG. 3.

Among the plurality of individual electrodes 53*a*, each of individual electrodes 53*a*, which are different from individual electrodes 53*a* positioned on one end and the other end in the X direction, has a part extending while spreading over two pressure chambers 10, of the plurality of pressure chambers 10, which are adjacent to each other in the X direction, and overlapping, in the Z direction, with the two pressure chambers 10 (see FIG. 5). Each of the individual electrodes 53*a* positioned on one end and the other end in the X direction has a part overlapping, in the Z direction, with one pressure chamber 10 of the plurality of pressure chambers 10. Further, each of the plurality of individual electrodes 53*a* has a part overlapping with one of the driving electrodes 51 in the Z direction. The plurality of individual electrodes 53*a* are aligned in the X direction and construct a plurality of individual electrode rows 53R each of which corresponds to one of the plurality of driving electrode rows 51R (see FIG. 7). The plurality of individual electrode rows 53R are arranged side by side in the Y direction.

Each of the six branched parts 533 connects individual electrodes 53*a*, of the plurality of individual electrodes 53*a*, constructing one of the individual electrode rows 53R. The extending part 531*a* of the trunk part 531 connects the six branched parts 533. The extending part 531*a* has six bifurcation parts B from each of which one of the six branched parts 533 is bifurcated (branched).

The high potential part 57 has one first part 57*a* which extends in the Y direction and two second parts 57*b* each of which extends in the X direction. The first part 57*a* extends in the Y direction at one end in the X direction (upper end of FIG. 9) of the piezoelectric layer 43. One of the two second parts 57*b* is connected to one end in the Y direction (left end of FIG. 9) of the first part 57*a*; the other of the two second parts 57*b* is connected to the other end in the Y direction (right end of FIG. 9) of the first part 57*a*. Each of the two second parts 57*b* extends from a contact part thereof with respect to the first part 57*a* toward the other side in the X direction (lower side of FIG. 9).

Each of the two second parts 57*b* overlaps, in the Z direction, with three electrodes 54*a*, of the plurality of electrodes 54*a*, constructing one of the two high potential parts 54 (see FIG. 7), and one of the two extending parts 521*b* of the high potential electrode 52 (see FIG. 8). Each of the two second parts 57*b* is electrically connected to one of the two extending parts 521*b* via a through hole 42*x* (see FIG. 8) formed in the piezoelectric layer 42 and receives the high potential from one of the two extending parts 521*b*.

The two floating electrode parts 66 are arranged, respectively, on one end in the Y direction (left end of FIG. 9) and on the other end in the Y direction (right end of FIG. 9) of the piezoelectric layer 43, at a location between the two second parts 57*b* and the two extending parts 531*b* in the X direction. Each of the two floating electrode parts 66 is constructed of a plurality of electrodes 66*a* arranged to be separated from each other in the X direction. The plurality of electrodes 66*a* has a size and a shape in the plane orthogonal to the Z direction which are substantially and mutually same among the plurality of electrodes 66*a*, and the plurality of electrodes 66*a* is arranged side by side in the Y direction at equal intervals therebetween.

The plurality of electrodes 66*a* of each of the two floating electrode part 66 are not electrically connected to any electrodes, and the potential is not applied to the plurality of electrodes 66*a*.

<Actuator>

As depicted in FIG. 5, a part, of the piezoelectric layer 41, which is sandwiched, in the Z direction, between a driving electrode 51 of the plurality of driving electrodes 51 and an individual electrode 52*a* of the plurality of individual electrodes 52*a* of the high potential electrode part 52 is referred to as a first active part 91. A part, of each of the piezoelectric layers 41 and 42, which is sandwiched, in the Z direction, between the driving electrode 51 of the plurality of driving electrodes 51 and an individual electrode 53*a* of the plurality of individual electrodes 53*a* of the low potential electrode 53 is referred to as a second active part 92. The first active part 91 is polarized mainly upward, and the second active part 92 is polarized mainly downward. The actuator member 22 has actuators 90 each of which is constructed of one piece of the first active part 91 and two pieces of the second active part 92 with respect to one of the plurality of pressure chambers 10. In each of the actuators 90, the two second active parts 92 are separated from each other and sandwiches the first active part 91 therebetween in the X direction. The X direction corresponds to an "orthogonal direction" of the present disclosure.

Here, an explanation will be given about an operation of an actuator 90, among the actuators 90, which corresponds to a certain nozzle 15, of the plurality of nozzles 15, in a case that the ink is caused to be discharged from the certain nozzle 15, with reference to FIGS. 6A and 6B.

Figure 6A:
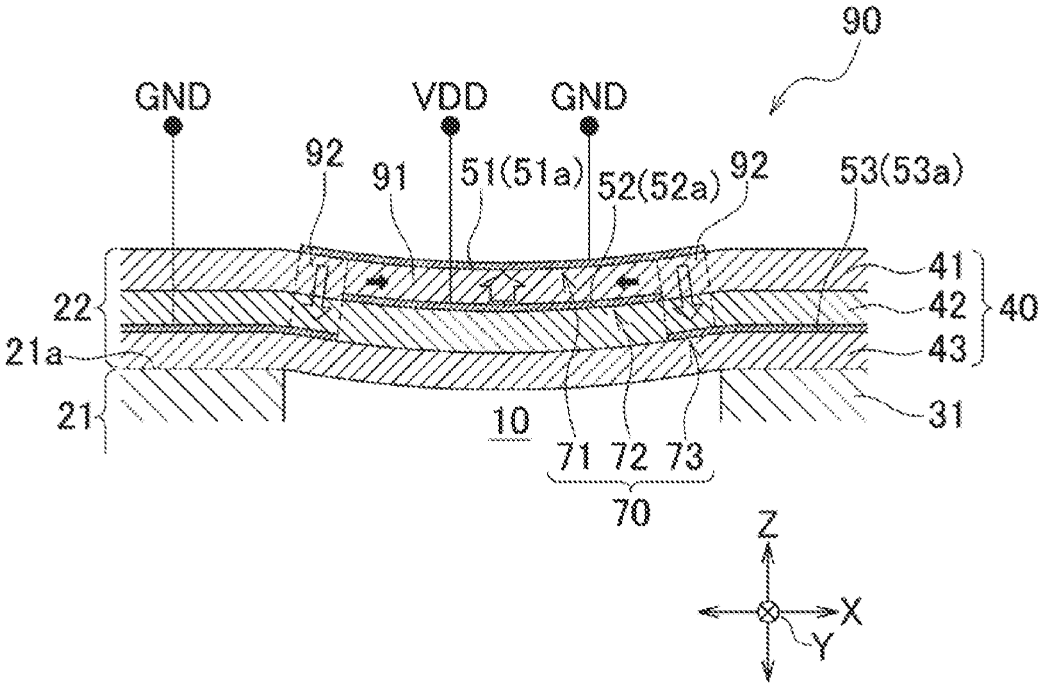
FIGS. 6A and 6B are views depicting an operation of an actuator in the cross section of FIG. 5.

Before the printer 100 starts a recording operation, the low potential (GND potential) is applied to each of the plurality of driving electrodes 51, as depicted in FIG. 6A. In this situation, an electric field which is upward same as the polarization direction of the first active part 91 is generated in the first active part 91 due to a difference in the potential between the driving electrode 51 and the high potential electrode 52, and thus the first active part 91 is contracted in a plane direction (a direction along the X direction and the Y direction). With this, a part which is included in a stacked body constructed of the piezoelectric layers 41 to 43 and which overlaps, in the Z direction, with a certain pressure chamber 10, of the plurality of pressure chambers 10, corresponding to the certain nozzle 15 is deflexed (deformed) to project toward the certain pressure chamber 10 (project downward). In this situation, the volume of the certain pressure chamber 10 is made small as compared with a case that the stacked body is flat.

Figure 6B:
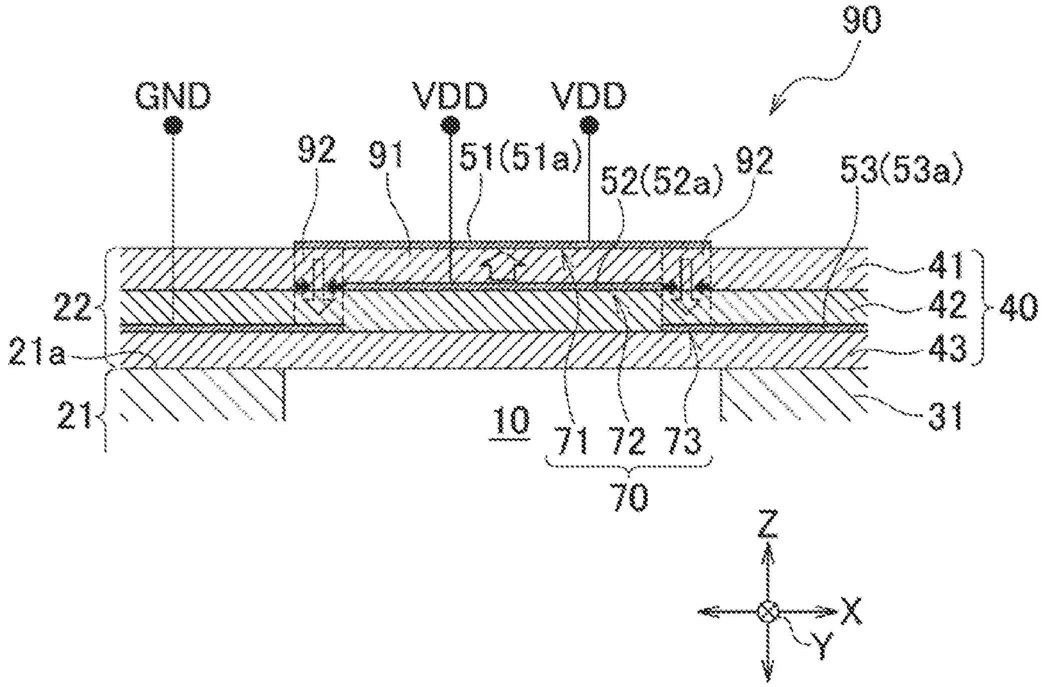

In a case that the printer 1 starts the recording operation and that the ink is to be discharged from the certain nozzle 15, first, as depicted in FIG. 6B, the potential of a certain driving electrode 51 of the plurality of driving electrodes 51 which corresponds to the certain nozzle 15 is switched from the low potential (GND potential) to the high potential (VDD potential). In this situation, the difference in potential is ceased to exist between the certain driving electrode 51 and the high voltage electrode 52, thereby cancelling the contraction of the first active part 91. On the other hand, a difference in potential is generated between the certain driving electrode 51 and the low potential electrode 53, an electric field which is downward same as the polarization direction of the two second active parts 92 is generated in each of the two second active parts 92, and thus each of the two second active parts 91 is contracted in the plane direction. Note, however, that each of the second active parts 92 has a function of suppressing a crosstalk (a phenomenon in which a variation in the pressure, in a certain pressure chamber 10, accompanying with deformation of the actuator 90 is propagated to another pressure chamber 10 which is adjacent to the certain pressure chamber 10 in the X direction), and each of the two second active parts 92 hardly contributes to the deformation of the actuator 90. Namely, in this situation, the part which is included in the stacked body and which overlaps, in the Z direction, with the certain pressure chamber 10 corresponding to the certain nozzle 15 is not deflexed (deformed) to project in a direction separating away from the certain pressure chamber 10 (project upward), and the stacked body is in the flat state. With this, the volume of the certain pressure chamber 10 is made great as compared with the illustration of FIG. 6A.

Afterward, as depicted in FIG. 6A, the potential of the certain driving electrode 51 which corresponds to the certain nozzle 15 is switched from the high potential (VDD potential) to the low potential (GND potential). In this situation, the difference in potential is ceased to exist between the certain driving electrode 51 and the low voltage electrode 53, thereby cancelling the contraction of the second active parts 92. On the other hand, the difference in potential is generated between the certain driving electrode 51 and the high potential electrode 52, thereby generating, in the first active part 91, the electric field which is upward same as the polarization direction of the first active part 91, and thus the first active part 91 is contracted in the plane direction. With this, the part which is included in the stacked body and which overlaps, in the Z direction, with the certain pressure chamber 10 corresponding to the certain nozzle 15 is deflexed (deformed) to project toward the certain pressure chamber 10 (project downward). In this situation, the volume of the certain pressure chamber 10 is greatly reduced, thereby applying a large pressure to the ink inside the certain pressure chamber 10, thereby causing the ink to be discharged from the certain nozzle 15.

<Cooling Channel>

In addition to the ink channel including the plurality of individual channels 19 and the twelve common channels 11, a cooling channel 60 (see FIGS. 10, 11 and 13) in which a cooling liquid (cooling fluid; for example, water) flows is formed in the channel member 21. The cooling channel 60 is independent from the ink channel and communicates with a cooling liquid tank (omitted in the drawings).

The cooling channel 60 has two U-shaped channels 6X formed along an outer circumference of the actuator member 22, as depicted in FIG. 10. Each of the two U-shaped channels 6X is constructed of one first part 61 extending in the Y direction and two parts 63 extending in the X direction; the two U-shaped channels 6X are arranged symmetrical with respect to the center in the X direction of the channel member 21.

Two pieces of the cooling liquid communication port 6 are arranged at the outside with respect to the two U-shaped channels 6X in the X direction. The first part 61 of each of the two U-shaped channels 6X and one of the two cooling liquid communication ports 6 are connected to each other via a connection part 69.

The first part 61 of a U-shaped channel 6X included in the two U-shaped channels 6X and arranged on one side in the X direction (upper side of FIG. 10) overlaps, in the Z direction, with the extending part 521*a* of the trunk part 521 of the high potential electrode 51 (see FIG. 8), and extends while spreading over the seven bifurcation parts A. The first part 61 of another U-shaped channel 6X included in the two U-shaped channels 6X and arranged on the other side in the X direction (lower side of FIG. 10) overlaps, in the Z direction, with the extending part 531*a* of the trunk part 531 of the low potential electrode 53 (see FIG. 9), and extends while spreading over the six bifurcation parts B.

In each of the two U-shaped channels 6X, the two parts 63 are connected, respectively, to one end and the other end in the Y direction of the first part 61. Each of the two parts 63 extends from the first part 61 toward the center in the X direction of the channel member 21 and has one end connected to the first part 61 and the other end on the opposite side to the first part 61.

In each of the two U-shaped channels 6X, an inflow port 60*x* is provided on the other end of one of the two parts 63, and an outflow port 60*y* is provided on the other end of the other of the two parts 63. The inflow port 60*x* and the outflow port 60*y* communicate with the cooling liquid tank. In each of the two U-shaped channels 6X, the cooling liquid flowed thereinto from the inflow port 60*x* flows one of the two parts 63, and then flows in the first part 61, flows in the other of the two parts 63, and flows out from the outflow port 60*y*.

Figure 11:
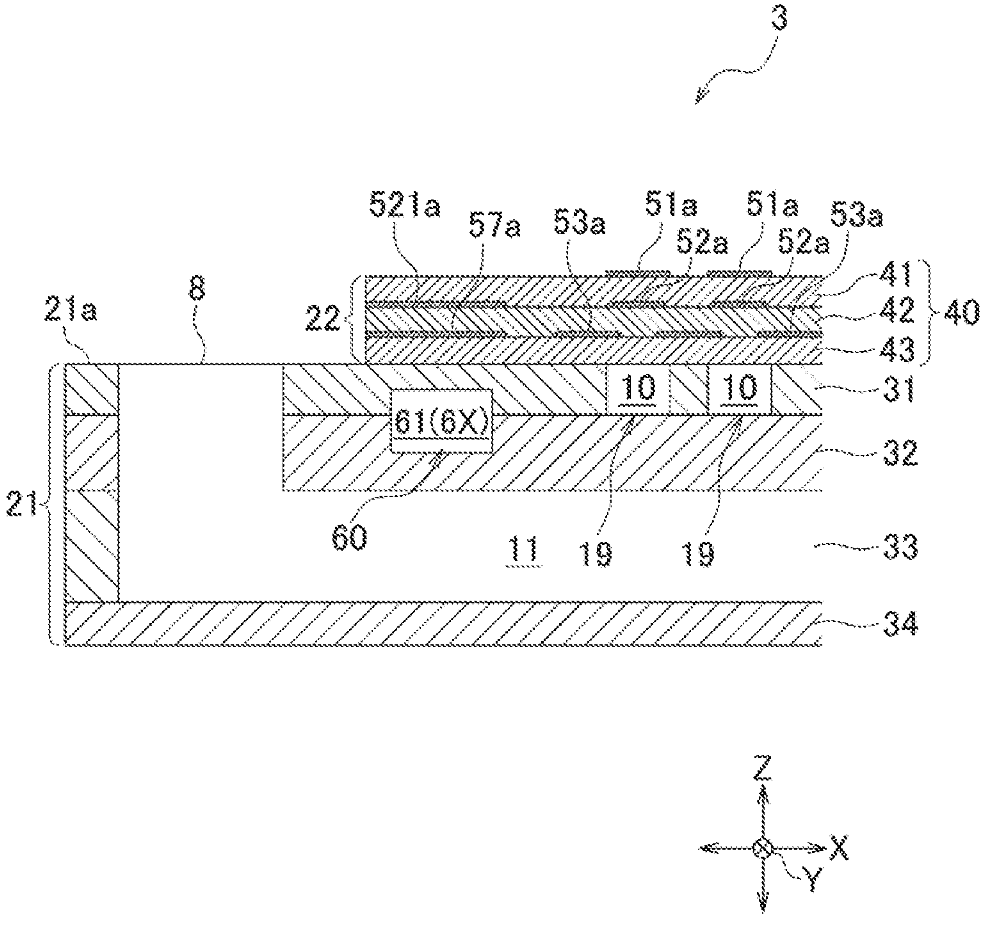
FIG. 11 is a cross-sectional view along an XI-XI line of FIG. 10.

As depicted in FIG. 11, each of the two U-shaped channels 6X is formed in the plates 31 and 32 of the channel member 21. The parts 61 and 63 of each of the two U-shaped channels 6X are each formed by a recessed part formed in a lower surface of the plate 31 and an upper surface of the plate 32 by, for example, half etching, etc.

Figure 13:
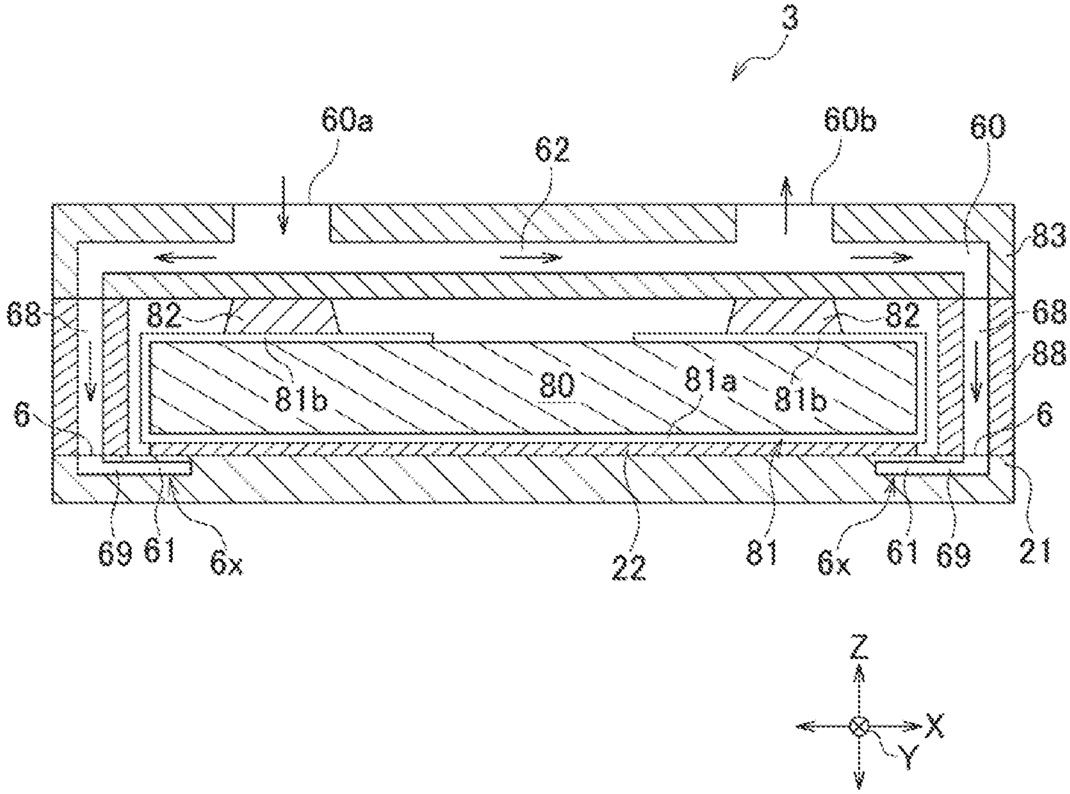
FIG. 13 is a cross-sectional view along an XIII-XIII line of FIG. 12.

In addition to the parts 61, 63 and 69 (see FIGS. 10 and 11) formed in the channel member 21, the cooling liquid channel 60 has a part 62 and a part 68 which are formed, respectively, in a heat sink 83 and an intermediate member 88 (see FIG. 13).

Figure 12:
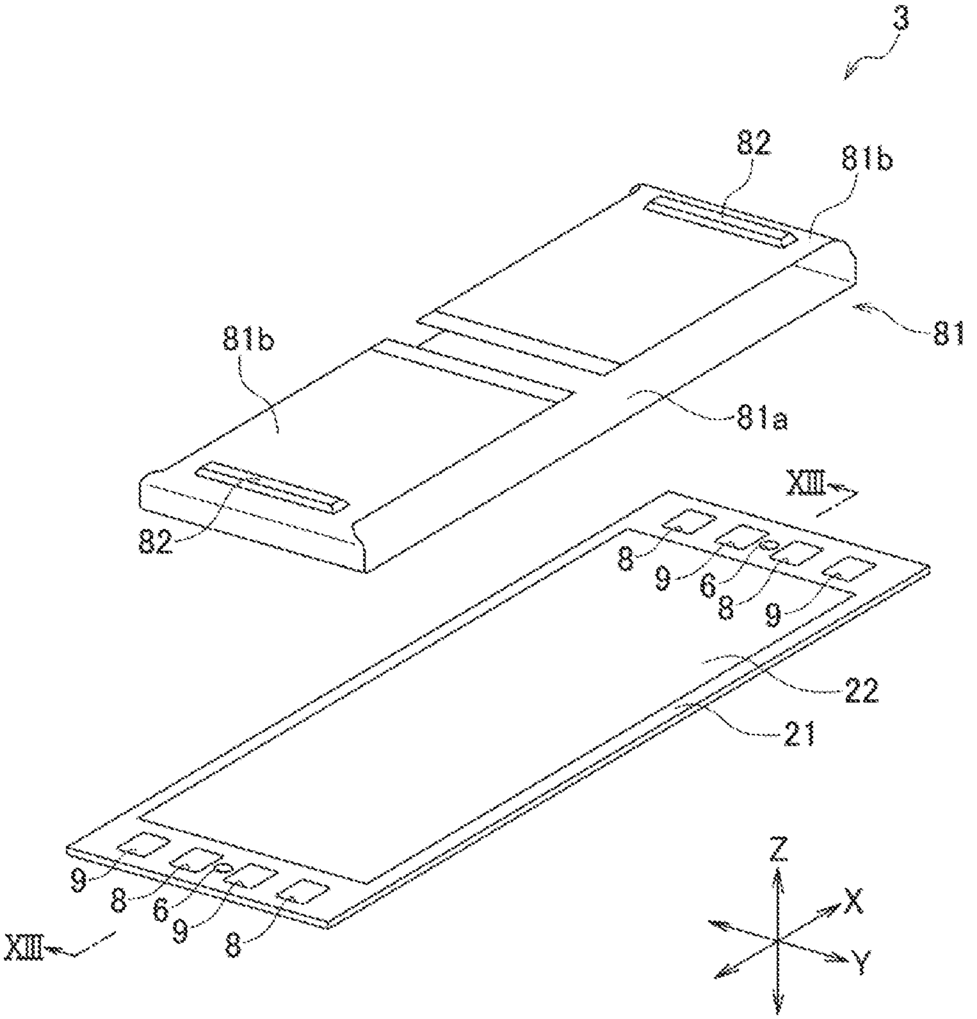
FIG. 12 is an exploded perspective view of a channel member and the actuator member, and a COF.

The COF 81 has a central part 81*a* arranged on the upper surface of the actuator member 22 and two drawn-out parts 81*b* which are drawn upward from both ends in the X direction of the central part 81*a*, as depicted in FIGS. 12 and 13. The driver IC 82 is mounted on each of the two drawn-out parts 81*b*, as two driver ICs 82.

As depicted in FIG. 13, the COF 81 is arranged along an outer surface of a holding member 80. The holding member 80 has a function of holding a posture of the COF 81 and is arranged on an upper surface of the central part 81*a*. The two drawn-out parts 81*b* are arranged on an upper surface of the holding member 80. The central part 81*a* of the COF 81 and the actuator member 22 are arranged between the holding member 81 and the channel member 21 in the Z direction.

The heat sink 83 is arranged on upper surfaces of the two driver ICs 82, and has a function of radiating heat of the two driver ICs 82. The intermediate member 88 is arranged between the heat sink 83 and the channel member 21.

The second part 62 of the cooling channel 60 is formed in the heat sink 83. The part 68 of the cooling channel 60 is formed in the intermediate member 88. The second part 62 extends in the X direction, and overlaps with the two driver ICs 82 in the Z direction. The part 68 extends downward from one end and the other end in the X direction of the second part 62 and is connected to the cooling liquid communication port 6.

An inflow port 60*a* and an outflow port 60*b* communicating with the cooling liquid tank are formed in an upper surface of the heat sink 83. The cooling liquid flowed from the inflow port 60*a* passes the second part 62 and flows out from the outflow port 60*b*. Further, the cooling liquid flows in the second part 62 passes the part 68 and flows into each of the two U-shaped channels 6X of the channel member 21 from the cooling liquid communication port 6.

Technical Effect of Present Embodiment

As described above, according to the present embodiment, the cooling channel 60 has the first part 61 overlapping, in the Z direction, with the trunk part 521 (extending parts 521*a*) or the trunk part 531 (extending part 531*a*) (see FIGS. 8 to 10). A vicinity part, in the channel member 21, which is in the vicinity of the trunk part 521 (extending parts 521*a*) or the trunk part 531 (extending part 531*a*) is cooled with the cooling liquid flowing in the first part 61, thereby suppressing the occurrence of such a situation that the temperature of the vicinity part locally becomes to be high. With this, it is possible to suppress any unevenness in the viscosity of the ink inside the channel member 21. Further, since the cooling channel 60 is independent from the plurality of individual channels 19, the flow rate of the cooling liquid can be controlled separately from the flow rate of the ink flowing in the plurality of individual channels 19, thereby making it possible to enhance the cooling effect by increasing the flow rate of the cooling liquid.

The first part 61 extends while spreading over the plurality of bifurcation parts A or B (see FIGS. 8 to 10). In this case, the configuration of the cooling channel 60 can be made simple as compared with a case of providing the first part 61 with respect to each of the plurality of bifurcation parts A and with respect to each of the plurality of bifurcation parts B.

At least a part of the first part 61 is formed in the plate 31 in which the plurality of pressure chambers 10 are formed (see FIG. 11). In this case, by using the plate 31 in which the plurality of pressure chambers 10 are formed for the formation of the cooling channel 60, there is no need to prepare a large number of plates for forming the cooling channel 60, thereby making it possible to simplify the configuration of the head 3 and to realize a low cost for the head 3.

The width of the trunk part 521 is greater than the width of each of the branched parts 523, and the width of the trunk parts 531 is greater than the width of each of the branched parts 533 (see FIGS. 8 and 9). It is necessary to secure the cross-sectional area for the trunk parts 521 and 531 in order to supply the potential. In order to secure the cross-sectional area, it is conceivable to make the thickness and/or the width of the trunk parts 521 and 531 be great; in such a case, however, the increased thickness might cause warping due to thermal contraction during the calcination of electrodes to easily occur. Accordingly, from the viewpoint of suppressing the warping, it is desired to increase the width of the trunk parts 521 and 531. However, the increased width of the trunk parts 521 and 531 might make the problem of the heat generation in the trunk parts 521 and 531 be more prominent. By applying the present disclosure in such cases, it is possible to effectively obtain the effect by the present disclosure.

The actuator 90 has the first active part 91 and the two second active parts 92 (see FIGS. 6A and 6B). In this case, in a case that the variation in pressure due to the deformation of the first active part 91 corresponding to a certain pressure chamber 10 is transmitted to another pressure chamber 10 adjacent to the certain pressure chamber 10, the variation in pressure is cancelled by the deformation of the two second parts 92, thereby making it possible to effectively suppress the crosstalk.

The cooling channel 60 further has the second part 62 overlapping with the driver ICs 82 in the Z direction (see FIG. 13). In this case, it is possible to cool not only the channel unit 21 but also the driver ICs 82. The driver ICs 82 and the channel member 21 are thermally connected or joined; by cooling the driver ICs 82, it is possible to further suppress the occurrence of any unevenness in the vicinity of the ink in the inside of the channel member 21.

The plurality of individual electrode rows 52R and the plurality of individual electrode rows 53R which are constructed, respectively, of the plurality of individual electrodes 52*a* and the plurality of individual electrodes 53*a* aligned in the X direction are provided (see FIGS. 8 and 9). The plurality of individual electrode rows 52R are arranged side by side in the Y direction, and the plurality of individual electrode rows 53R are arranged side by side in the Y direction. The branched parts 523 and 533 extend in the X direction and arranged side by side in the Y direction so as to correspond, respectively, to the plurality of individual electrode rows 52R and the plurality of individual electrode rows 53R. The extending part 521*a* of the trunk part 521 and the extending part 531*a* of the trunk part 523 extend in the Y direction. The first part 61 of each of the two U-shaped channels 6X of the cooling channel 60 extends in the Y direction so as to correspond to the extending part 521*a* or 531*a*, and overlaps with the extending part 521*a* or 531*a* in the Z direction (see FIG. 10). In this case, it is possible to realize an effective configuration suitable for the alignment and arrangement of the individual electrodes 52*a* and 53*a*.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

<Modifications>

Although the embodiment of the present disclosure has been explained above, the present disclosure is not limited to the above-described embodiment; various design changes are possible, without departing from the claims.

The cooling channel is not limited to or restricted by being positioned below the trunk part and may be positioned above the trunk part.

In the above-described embodiment, although the cooling channel is constructed of the recessed parts (see FIG. 11) formed in the plates, the cooling channel is not limited to this and may be constructed of a through hole.

It is allowable that the first part and the second part of the cooling channel do not communicate with each other. Further, it is allowable that the cooling channel does not have the second part.

The present disclosure is not limited to the configuration that the first potential is the high potential and that the second potential is the low potential; the reverse of this (namely, the first potential is the low potential and that the second potential is the high potential) is also allowable. In such a case, the high potential electrode 52 may be positioned in the lowermost layer, and the low potential electrode 53 may be positioned in the intermediate layer.

Although the number (quantity) of the piezoelectric layer constructing the actuator member is 3 (three) in the above-described embodiment, the number (quantity) of the piezoelectric layer may be 2 (two) or not less than 4 (four). For example, in the above-described embodiment (see FIG. 4), it is allowable to provide a vibration plate made of stainless steel, etc., rather than providing the piezoelectric layer 43. Alternatively, in the above-described embodiment (see FIG. 4), it is allowable to arrange another piezoelectric layer between the piezoelectric layer 43 of the actuator member 22 and the plate 31 of the channel member 21.

The present disclosure is not limited to the printer, and is applicable also to facsimiles, copy machines, multifunction peripherals, etc. Further, the present disclosure is also applicable to a liquid discharge apparatus used for any other application than the image recording (for example, a liquid discharge apparatus which forms an electroconductive pattern by discharging an electroconductive liquid on a substrate).

What is claimed is:

1. A liquid discharge head comprising:

a channel member including a plurality of individual channels, each of the plurality of individual channels including a nozzle and a pressure chamber communicating with the nozzle;

an actuator member located on a surface of the channel member and including a plurality of actuators overlapping with the pressure chamber of one of the plurality of individual channels in a first direction orthogonal to the surface, the actuator member including:

a plurality of individual electrodes of the plurality of actuators;

a plurality of branched parts each connecting individual electrodes of the plurality of individual electrodes; and a trunk part connecting the plurality of branched parts and including a contact with respect to an electric power supply part; and a cooling channel independent from the plurality of individual channels and configured to flow a cooling liquid, wherein the cooling channel includes a first part overlapping with the trunk part in the first direction.

2. The liquid discharge head according to claim 1, wherein the trunk part includes a plurality of bifurcation parts from each of which one of the plurality of branched parts is bifurcated, and the first part extends while spreading over the plurality of bifurcation parts.

3. The liquid discharge head according to claim 1, wherein the channel member includes a plate including the pressure chamber, and the plate includes at least a part of the first part.

4. The liquid discharge head according to claim 1, wherein a width of the trunk part is greater than a width of each of the plurality of branched parts.

5. The liquid discharge head according to claim 1, wherein the actuator member includes:

a piezoelectric body including a plurality of piezoelectric layers stacked in the first direction; and an electrode body including:

a first electrode layer;

the first direction; and a second electrode layer being separated from the first electrode layer in a third electrode layer which is separated from the first electrode layer in the first direction, the first electrode layer includes a plurality of first electrodes, a first potential and a second potential different from the first potential are selectively applied to the plurality of the first electrodes, and each of the plurality of the first electrodes overlaps with the pressure chamber of one of the plurality of individual channels in the first direction, the second electrode layer includes a second electrode maintained at the first potential, the third electrode layer includes a third electrode maintained at the second potential, the piezoelectric body includes:

a first active part sandwiched by each of the plurality of first electrodes and the second electrode in the first direction; and two second active parts each sandwiched by one of the plurality of first electrodes and the third electrode in the first direction, the two second active parts being separated from each other and sandwiching the first active part between the two second active parts in an orthogonal direction orthogonal to the first direction, and at least one of the second electrode and the third electrode includes the plurality of individual electrodes, the plurality of branched parts and the trunk part.

6. The liquid discharge head according to claim 1, further comprising a driving circuit configured to supply a driving signal to the plurality of actuators, wherein the cooling channel further includes a second part overlapping with the driving circuit in the first direction.

7. The liquid discharge head according to claim 1, wherein the plurality of individual electrodes forms a plurality of individual electrode rows each of which is aligned in a second direction orthogonal to the first direction, wherein the plurality of individual electrode rows is arranged side by side in a third direction orthogonal to the first direction and crossing the second direction, the plurality of branched parts extends in the second direction, and is arranged side by side in the third direction, the trunk part has an extending part extending in the third direction, and the first part extends in the third direction and overlaps with the extending part in the first direction.

* * * * *